United States Patent [19]

Pate et al.

[11] Patent Number: 4,852,393
[45] Date of Patent: Aug. 1, 1989

[54] PIPE SEGMENT PRESSURE TESTER AND PROCESS OF USE

[75] Inventors: Charles D. Pate, Friendswood; Bob R. Young, Pasadena; Hector Plata, Rosenberg, all of Tex.

[73] Assignee: Loomis International, Pasadena, Tex.

[21] Appl. No.: 185,662

[22] Filed: Apr. 25, 1988

[51] Int. Cl.$^4$ ............................................. G01M 3/28
[52] U.S. Cl. .................................................... 73/49.5
[58] Field of Search .................. 73/49.1, 49.5; 138/90, 138/91, 93

[56] References Cited

U.S. PATENT DOCUMENTS 2,481,013  9/1949  Henderson ...................... 73/49.1 X

FOREIGN PATENT DOCUMENTS 2932280  2/1981  Fed. Rep. of Germany ....... 73/49.5
539788   2/1956  Italy ..................................... 73/49.5
845058   7/1981  U.S.S.R. ............................... 73/49.5

OTHER PUBLICATIONS

*Pressure Testing Piping and Tubing,* NASA Publication MSC-15185.

*Primary Examiner*—Stewart J. Levy
*Assistant Examiner*—Joseph W. Roskos
*Attorney, Agent, or Firm*—Cushman, Darby & Cushman

[57] ABSTRACT

An apparatus and method for pressure testing pipe segments. The apparatus including a main body portion thereof with seals located at either end for sealing the main body portion to the inside of the pipe segment. The body portion being withdrawn and inserted into the pipe segment by an extended draw bar attached to one end thereof.

8 Claims, 1 Drawing Sheet

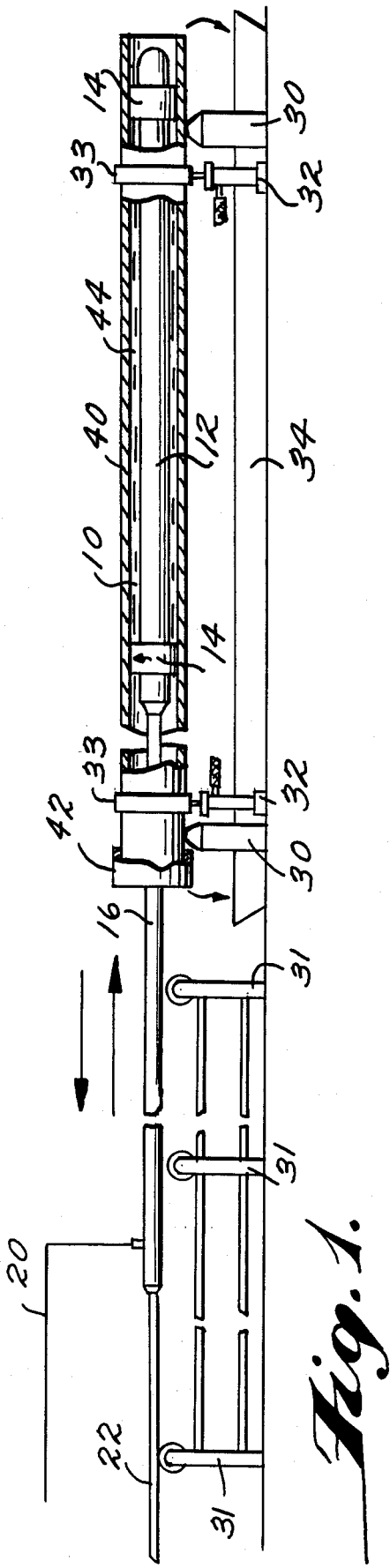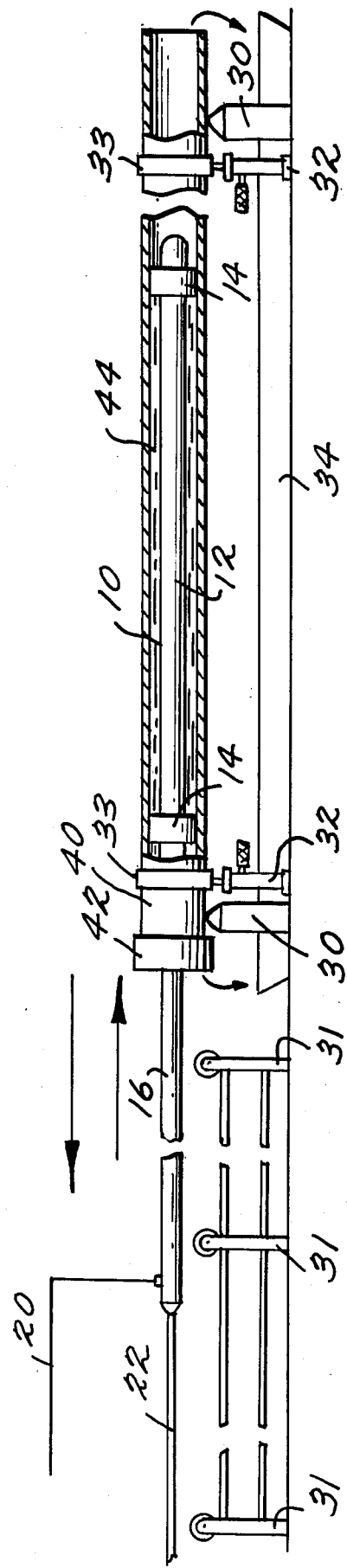

PIPE SEGMENT PRESSURE TESTER AND PROCESS OF USE

FIELD OF THE INVENTION

The present invention relates to an apparatus and method for pressure testing pipe segments. More particularly, the present apparatus and method are directed towards high pressure testing of threaded and unthreaded pipe segments used for well drilling wherein the pressures used in testing range considerably and vary from approximately 2000 psi to over 25,000 PSI.

BACKGROUND OF THE INVENTION

A critical part of business operations in the well drilling industry is equipment testing. Part of that equipment includes lengths of pipe which are extended down well holes and remain in place for several years under adverse conditions. Should a pipe segment fail, the costs associated with correcting such a failure are prohibitively high and, in some instances, the failure may even be irreparable. As such, pressure testing pipe segments has become an integral part of preparing and testing the equipment to be used in creating a well.

There have developed two widespread methods of pressure testing pipe segments. The first is known as "rack" testing. This testing method involves threading each end of a pipe segment with a plug and thereafter pumping fluid into the internal cavity of the pipe until a predetermined test pressure has been reached. Upon completion of the test, the pressure is released and the end plugs removed from the pipe segments.

A second method of pipe testing is known as the "mill" testing procedure. The mill tester is a large machine which is capable of simultaneously gripping and plugging off the opposite ends of a pipe segment. This gripping and plugging action takes place in a trough of fluid so that when the pipe segment is initially gripped by the tester, the pipe segment is at least partially filled with fluid. The remaining voids within the pipe are then pumped full with fluid through the mill tester end plugs. The fluid is pressurized to a desired predetermined test pressure, the pressure is then released and the pipe removed from the trough.

There are several drawbacks associated with each of the prior art methods of pipe segment pressure testing. With regard to the "rack" test, the drawbacks are that the pipe end portions are threaded and unthreaded several times over the useful life of a pipe for testing purposes only. As such, the threads can become worn and possibly misaligned during the several threading and unthreading procedures. Further, the mechanisms which are used to thread the segments of pipe with plugs often cause minor damage to the exterior of the pipe owing to their gripping action. The major drawback to this method of testing, however, is related more to the advancements in the material composition of the pipe. Specifically, advances in materials have made pipe segments far more resistant to failures associated with internal pressure. As such, the predetermined test pressures have increased to the extent that the plugs mounted on the respective ends of a pipe segment can no longer withstand the pressure. This is because the area of a plug end which is resisting the pressure is equivalent to the full cross-sectional area of a pipe. If a pipe diameter is 8 inches and the testing pressure 20,000 PSI, the accumulated pressure which the end plug must resist is approximately 500 tons of force.

The advancement in material compositions of the pipe has also created several drawbacks to the mill testing method. Specifically, as the pipe materials have advanced in their strength the associated mill testers have also necessarily advanced in their capacity to exert sufficient pressure on the ends of the pipe segments during testing. As such, the mill testing apparatus has become extremely bulky and virtually immobile. Further, as materials advance even further it is uncertain whether a mill tester can be built which could withstand the necessary end pressures so as to properly test a pipe segment.

Another method of testing pipe segments, disclosed in U.S. Pat. No. 4,557,139, was developed so as to test the threaded joints between adjacent pipe sections. This method was developed primarily to test a length of related pipe segments in a vertical orientation in a derrick. Particularly, a testing apparatus was inserted into the open upper end of a series of pipe segments and lowered therethrough and placed so as to correspond to successive threaded joints of the related pipe segments. The testing tool was sealed at each end thereof to the inner surfaces of the pipe and fluid was pumped into the annular cavity separating the testing tool and the pipe segments. In this manner, several threaded joints could be tested in series without the need for separating the related pipe segments.

From this vertical testing procedure, there was developed a horizontal pipe testing procedure whereby pipe lengths could be laid down onto a substantially horizontal rack and a pipe testing tool would be inserted therein, pressured up, and the pipe segments tested. However, pipe segments come in several different lengths ranging from approximately 20 feet to 60 feet. As a result, the pipe tester was also made to be necessarily capable of being configured in several lengths. The drawback of this testing method was the time consuming assembly and disassembly of the pipe tester into the several lengths required by the varied pipe segment dimensions.

SUMMARY OF THE INVENTION

The apparatus and method of the present invention solve several problems associated with the prior art testing methods. The apparatus of the present invention is a tubular testing instrument similar to that disclosed in the third testing method described above but the length of which is reduced to a length slightly shorter than the shortest anticipated pipe length. An extended draw bar element is attached to one end of the pipe tester which enables the testing tool to be inserted into pipe lengths whose lengths substantially exceed the length of the testing tool.

Because of the difference in lengths between the testing tool and the tested pipe lengths, the testing process is done in two or more overlapping stages of pressurized testing for a given length of pipe. A pipe length whose length exceeds that of the testing tool is segmentally tested in segments equal in length to the length of the testing tool. In this manner, pipe lengths of widely varying dimensions can be tested in an efficient and timely manner.

The testing apparatus may also incorporate a rubber coating completely surrounding the testing tool so as to protect the pipe segments when the testing tool is inserted and withdrawn therefrom. Additionally, the seals on the testing tool are expandable so as to accommodate pipe diameters of some variance so that a standard testing tool can accommodate a plurality of pipe lengths and diameters.

Further objects of this invention as well as the novel features thereof will become more apparent by reference of the following description taken in conjunction with the accompanying drawing figures.

BRIEF DESCRIPTION OF THE DRAWINGS

FIG. 1 is a side cutaway view of a testing tool according to the present invention inserted to the far end of a tested pipe segment.

FIG. 2 is a side cutaway view of a testing apparatus according to the present invention with the testing tool inserted to a front end of a tested pipe segment.

DETAILED DESCRIPTION OF THE PREFERRED EMBODIMENT

The apparatus and method of the present invention will be described with reference to drawing FIGS. 1 and 2. The testing tool 10 is comprised of a main body portion 12 which is approximately 12-40 feet in length. The main body portion has high pressure seals 14 located on each end thereof. These seals are of the type disclosed in U.S. Pat. No. 3,038,542, which is incorporated herein by reference. These seals used in the packer assembly disclosed in U.S. Pat. No. 3,038,542 have since been developed so as to be capable of withstanding pressures exceeding 25,000 PSI exerted from within the segmented pipe length being tested.

Main body portion 12 has a drawbar 16 attached to a rearward end thereof. This drawbar comprises a smaller diameter tubular length which extends from the main body portion of the testing tool and allows the testing tool to be inserted into a pipe length which substantially exceeds the length of the main body portion 12 of the testing tool. Both the main body portion 12 and drawbar 16 are tubular in construction and accommodate therein passages for fluids which pressurize the seals 14 and the annular cavity 44. These internal pressure passages are attached to pressure line 20 which in turn is connected to a high pressure fluid pumping apparatus (not shown).

The internal sealing of the pipe segment to the tool can be accomplished by one of three methods depending on the test pressure range being used. If the desired test pressure range is 0-10,000 PSI, a seal pressurizing system known as the "orifice" method is generally employed. To use this method, the body portion is equipped with one or two small orifices (each approximately 1/16 inch across) along its length (not shown). Pressurized fluid is pumped into the internal passage of main body portion 12 so as to simultaneously pressure charge seals 14 and begin filling annular cavity 44. When the seals have been sufficiently charged with pressure, the accumulated pressure in the seals forces the pumping fluid to exit even more rapidly through the orifice[s] into the surrounding annular cavity.

The second system of pressurizing the seals and annular cavity is used for test pressure ranges exceeding 10,000 psi. This second method is called the "portsub" system. This system includes a check valve along the internal pressure line of main body portion 12 which pressurizes the seals in the range of 900-1200 psi before allowing fluid to pass through an orifice into the annular cavity. The pressurizing fluid is pumped against this check valve throughout the pressurizing phase. Hence, the pressurizing step takes longer than with the orifice system because of the sustained higher pumping pressures. However, this "portsub" method is more suited to higher pressure testing wherein extremely secure sealing of the seals 14 is more critical.

A third method of sealing seals 14 is also used in low pressure pipe testing. This third method is known as the "cup packer" method and involves simply forcing the seals 14 into a pipe segment using liberal coatings of lubricant. This third method is used where the inside diameter of a pipe segment is variable to the extent that an inflatable seal could not fit through narrow portions of the pipe and yet still expand sufficiently to seal other larger portions thereof.

The testing tool 10 is propelled into and withdrawn from pipe segment 40 by drawing mechanism 22. This drawing mechanism may be of any convenient design which enables the positive pushing or pulling of the testing tool in an out of the pipe segments. A preferable construction of the drawing mechanism is a cog driven chain positioned parallel to the path of the testing tool as it is withdrawn and inserted into pipe segments.

The testing tool rides on tool rack support stands 31. These support stands may be equipped with rollers or other slidable bearing apparatus so as to enable the testing tool to slide in and out of a pipe segment.

Pipe segment 40 rests on pipe rack stands 30. These pipe rack stands may be of any suitable configuration which can carry the weight of the pipe, testing tool composite, associated test fluids, and also allow movement of the pipe segment laterally across the rack when testing is completed. Between the forward most and the rearward most pipe rack stands there is positioned a pair of hydraulic cinches 32. Hydraulic cinches 32 are connected to cinch straps or clamps 33 which wrap around and secure pipe segment 40 against pipe rack stand 30. In this manner, the pipe segment is securely fastened and restrained against the pipe rack stand should any failure of the pipe take place during testing.

A trough 34 is positioned directly beneath the pipe segment testing area of the pipe rack stand 30. Trough 34 enables the retrieval and recycling of the fluid which is used to pressurize the pipe segment during testing.

The main body portion 12 and drawbar 16 of the testing tool are preferably covered with a rubber jacket so as to prevent damage to the pipe segments as the testing tool is inserted and withdrawn during a testing procedure. Further, a tool guide 42 is placed on the front end of a test pipe segment 40 so as to prevent damage to the front end of a pipe segment upon initial insertion therein of the testing tool.

One reason for the success of the present invention is the reduced pressure area available against the testing tool pressure seals 14 on each end of main body member 12. The main body portion of the testing tool is substantially similar in outer diameter to a given pipe segment inside diameter. The difference between the respective outside and inside diameters being made up for by the diameter of the seals 14 mounted on each end of the main body portion 12. In this manner, the area of a respective seal 14 against which fluid pressure acts during a testing operation is only the difference in area between the cross sectional area of a pipe segment and the cross sectional area of the main body portion of the testing tool. Hence, instead of opposing several hundred tons of force as required in the prior art testing methods discussed above, the seals of the present testing tool must resist only a fraction of the pressure withstood by the prior art testing apparatus. As such, the present testing apparatus and method is far safer with regard to catastrophic failure of the testing tool and associated seals than the prior art testing methods. Also, the reduced forces allow for a far more compact and simplified apparatus and procedure.

In operation, a pipe segment is placed in approximate horizontal alignment with the testing tool which is resting on the tool rack 31 and associated rollers. The pipe segment is wrapped by cinch straps or clamps 33 and securely positioned by hydraulic cinches 32 on pipe rack 30. Tool guide 42 is then placed over the front end of the pipe segment so as to protect the front end against damage from the inserted testing tool. The testing tool is liberally coated with piping dope so as to lubricate the testing tool and ease the insertion thereof into the pipe segment. The testing apparatus may also incorporate other means of easing the insertion thereof into the pipe such as small externally biased wheels mounted along the length of the main body portion 12.

Once the pipe segment is secured in position and prepared for insertion of the testing tool, the drawing mechanism 22 is activated so as to propel drawbar 16 and the attached testing tool horizontally into the pipe segment 40. The testing tool is inserted until a front end thereof is proximate to a back end of the pipe segment. Once the testing tool is in this initial position, the tool is securely sealed to the surrounding pipe segment by one of the "orifice", "portsub", or "cup packer" sealing methods previously described. After the seals have been sufficiently sealed to create a fluid tight seal around main body portion 12, pressure line 20 is either initially activated (if using the cup packer method) or continues to pump fluid (if using either of the portsub or orifice methods) through drawbar 16 and main body portion 12 into the annular cavity 44 existing between the outside diameter of the testing tool and the inside diameter of pipe segment 40. During the annular cavity filling stage, air trapped in the annular cavity 44 can be forced past one of the seals 14 by the pressurized fluid filling the annular cavity. This forced venting process occurs until substantially all of the air trapped in annular cavity 44 is forced to exit from the pipe segment. To assist in allowing the air to exit at a particular end of the pipe segment, the pipe segment may be slightly tipped either forward or rearward so as to allow exiting air to naturally travel to the seal 14 located at the upward end of the pipe segment. To complete the test, pressure line 20 continues to bring the testing pressure up to a predetermined level suitable for testing the particular pipe segment in question.

Once the operating personnel are satisfied that a particular pipe segment is sufficiently tested (usually an interval of several seconds to several minutes), the pressure is lowered in annular cavity 44 and seals 14 are depressurized so as to permit withdrawal of the testing tool from within the pipe segment. If the pipe segment is of sufficient length to require an overlapping testing procedure, the testing procedure is repeated throughout segmented lengths of a pipe segment until, through overlapping tests, the entire pipe length has been pressure tested. Usually, a standard pipe length requires no more than two overlapping tests to complete the pressure testing thereof.

In moving the testing tool along segments of pipe 40, not all of the fluid contained in cavity 44 needs to be released therefrom. In this manner, by displacing a certain portion of the pressure fluid with the testing tool along the segments of the pipe segment, only moderate repumping of fluid into the annular cavity is necessary so as to complete subsequent segment tests.

The advantages of the present apparatus and method are several. The pipe segment does not need to be threaded prior to testing so that the expense of threading defective pipe segments can be avoided. If already threaded, the pipe segment threads are not subjected to wear and/or damage resulting from being threaded and unthreaded several times, over the course of its use, merely for pressure testing procedures. Further, a large bulky apparatus for suitably testing the stronger lengths of pipe is not required. By contrast, the apparatus of the present invention is portable to the extent that a particular onsite location can accommodate a pipe length and the length of testing tool in horizontal alignment so as to perform the testing procedure. In certain instances this may be accommodated even on offshore well drilling platforms.

While we have described our invention in connection with a specific embodiment thereof, it is to be clearly understood that this is done only by way of example, and not as a limitation to the scope of our invention as set forth and in the appended claims.

What is claimed is:

1. Apparatus for pressure testing of pipe segments, comprising:

a tubular body portion having first and second ends and having high pressure seal means proximate to each end of said tubular body portion for sealing said body portion to an inner surface of a surrounding pipe segment, said first and second ends each having pressure actuation means for expanding each said respective seal means from a retracted to an extended position wherein said seal means extends radially outwardly from said tubular body portion to support said tubular body portion on said inner surface of a surrounding pipe segment and to seal an annular cavity enclosed by said inner surface of said surrounding pipe segment, said tubular portion located between said first and second ends and said respective seal means, said tubular body portion and said first and second ends being out of contact with said inner surface of the surrounding pipe segment when said seal means are expanded from said retracted position.

said first end having draw bar means connected thereto for inserting and extracting said tubular body portion from a pipe segment, and said draw bar means and said tubular body portion having fluid feed lines located therein for pressurizing and actuating said seals and for directing fluid outside of said body portion into said annular cavity between said body portion and an inner surface of a surrounding pipe segment.

2. Apparatus according to claim 1, wherein:
said tubular body portion is coated with elastic jacket means for protecting a pipe segment from damage during testing.

3. Apparatus according to claim 2, wherein:
said tubular body portion is of fixed length.

4. Apparatus according to claim 2, wherein: said high pressure seal means are capable of withstanding pressures in the range of 0–10,000 psi.

5. Apparatus according to claim 2, wherein: said high pressure seal means are capable of withstanding pressures in excess of 10,000 psi.

6. A pressure testing method for pipe segments with a testing tool of the type having front and back end seals, comprising the steps of:

arranging a pipe segment in a substantially horizontal plane, securing said segment of pipe in said substantially horizontal plane, inserting the pressure testing tool having front and back end seals into a first end of said pipe until said front end seal of said testing tool is proximate to a second end of said pipe, said front and back end seals being of the type that are pressure actuated to expand from a retracted to an extended position to engage and seal the interior surface of the pipe being tested, sealing said tool inside said pipe segment at said front end and back end seals of said tool, by expanding said end seals from said retracted to said extended positions to maintain said pressure tool out of contact with the inner surface of said pipe segment except through said end seals while in said extended positions pumping fluid into the annular space between said tool and an inner surface of said pipe, pressurizing said fluid in said annular space to a predetermined pressure, releasing said fluid pressure and partially releasing said seals between said pipe and said testing tool to an extent where said seals maintain said testing tool out of contact with the interior surface of said pipe segment except through said seals, successively repeating the sealing, pumping, pressurizing, and releasing steps except that said front and back end seals are only partially released to thereby retain at least a portion of said dumping fluid between said end seals and drawing said tool along said pipe until said first end seal of said tool is proximate said front end of said pipe, sealing said tool inside said pipe segment at said front and back end seals of said tool, pumping fluid into the annular space between said tool and an inner surface of said pipe, pressurizing said fluid in said annular space to a predetermined pressure, releasing said fluid pressure and said seals between said pipe and said tool, and withdrawing said tool from said pipe segment.

7. A method according to claim 6, wherein:
said pressure tool is liberally coated with lubricant prior to insertion into a pipe segment.

8. A method according to claim 7, wherein:
a tool guiding collar is placed around said first end of said pipe prior to insertion therein of said pressure tool.

* * * * *